(12) United States Patent
Masson et al.

(10) Patent No.: US 9,859,546 B2
(45) Date of Patent: Jan. 2, 2018

(54) METHOD FOR PRODUCING AN ELECTROCHEMICAL BUNDLE OF A LITHIUM BATTERY

(71) Applicant: COMMISSARIAT À L'ENERGIE ATOMIQUE ET AUX ENERGIES ALTERNATIVES, Paris (FR)

(72) Inventors: Olivier Masson, Grenoble (FR); Frédéric Dewulf, Voiron (FR); Pierre Jost, Saint-Pierre de Mesage (FR); Come-Emmanuel Leys, Grenoble (FR)

(73) Assignee: COMMISSARIAT À L'ENERGIE ATOMIQUE ET AUX ENERGIES ALERNATIVES, Paris (FR)

( * ) Notice: Subject to any disclaimer, the term of this patent is extended or adjusted under 35 U.S.C. 154(b) by 53 days.

(21) Appl. No.: 15/025,048

(22) PCT Filed: Sep. 11, 2014

(86) PCT No.: PCT/IB2014/064431
§ 371 (c)(1),
(2) Date: Mar. 25, 2016

(87) PCT Pub. No.: WO2015/044820
PCT Pub. Date: Apr. 2, 2015

(65) Prior Publication Data
US 2016/0226056 A1 Aug. 4, 2016

(30) Foreign Application Priority Data

Sep. 25, 2013 (FR) .................................... 13 59223

(51) Int. Cl.
*H01M 2/26* (2006.01)
*H01M 2/30* (2006.01)
(Continued)

(52) U.S. Cl.
CPC ............. *H01M 2/30* (2013.01); *H01M 2/022* (2013.01); *H01M 2/024* (2013.01); *H01M 2/263* (2013.01);
(Continued)

(58) Field of Classification Search
CPC ........ H01M 2/30; H01M 4/661; H01M 2/024; H01M 2/022; H01M 2/263; H01M 10/052;
(Continued)

(56) References Cited

U.S. PATENT DOCUMENTS

| 3,761,314 A | 9/1973 | Cailley |
| 6,818,025 B1 * | 11/2004 | Ura ....................... H01M 2/263 29/623.1 |

(Continued)

FOREIGN PATENT DOCUMENTS

| EP | 1596449 A2 | 11/2005 |
| FR | 2094491 A5 | 2/1972 |

*Primary Examiner* — Cynthia K Walls
(74) *Attorney, Agent, or Firm* — Oliff PLC

(57) ABSTRACT

A method for producing an electrochemical bundle of a lithium battery, such as an Li-ion battery, with a view to electrically connecting same to the output terminals of the battery, wherein it includes the combination of two steps of folding an electrochemical bundle of a lithium battery which are carried out separately, i.e. a radial folding with plastic deformation and an axial compacting, which make it possible to obtain two separate areas on at least one, and preferably both, of the lateral ends of the bundle. The invention also concerns a method for producing an electrical connection part between the electrochemical bundle and one of the output terminals of the battery, and an associated current collector.

14 Claims, 12 Drawing Sheets

(51) Int. Cl.
*H01M 2/02* (2006.01)
*H01M 10/052* (2010.01)
*H01M 10/0525* (2010.01)
*H01M 10/0587* (2010.01)
*H01M 4/66* (2006.01)
H01M 2/36 (2006.01)
H01M 4/131 (2010.01)
H01M 4/485 (2010.01)
H01M 4/505 (2010.01)
H01M 4/525 (2010.01)
H01M 10/04 (2006.01)

(52) U.S. Cl.
CPC ......... *H01M 4/661* (2013.01); *H01M 10/052* (2013.01); *H01M 10/0525* (2013.01); *H01M 10/0587* (2013.01); *H01M 2/36* (2013.01); *H01M 4/131* (2013.01); *H01M 4/485* (2013.01); *H01M 4/505* (2013.01); *H01M 4/525* (2013.01); *H01M 10/0431* (2013.01)

(58) Field of Classification Search
CPC ......... H01M 10/0525; H01M 10/0587; H01M 10/0431; H01M 4/131; H01M 4/485; H01M 4/505; H01M 2/36; H01M 4/525
See application file for complete search history.

(56) References Cited

U.S. PATENT DOCUMENTS 8,007,549 B2   8/2011  Ligeois et al.
2006/0240323 A1*  10/2006  Tomihara ................ H01M 2/22
                                                        429/211

* cited by examiner

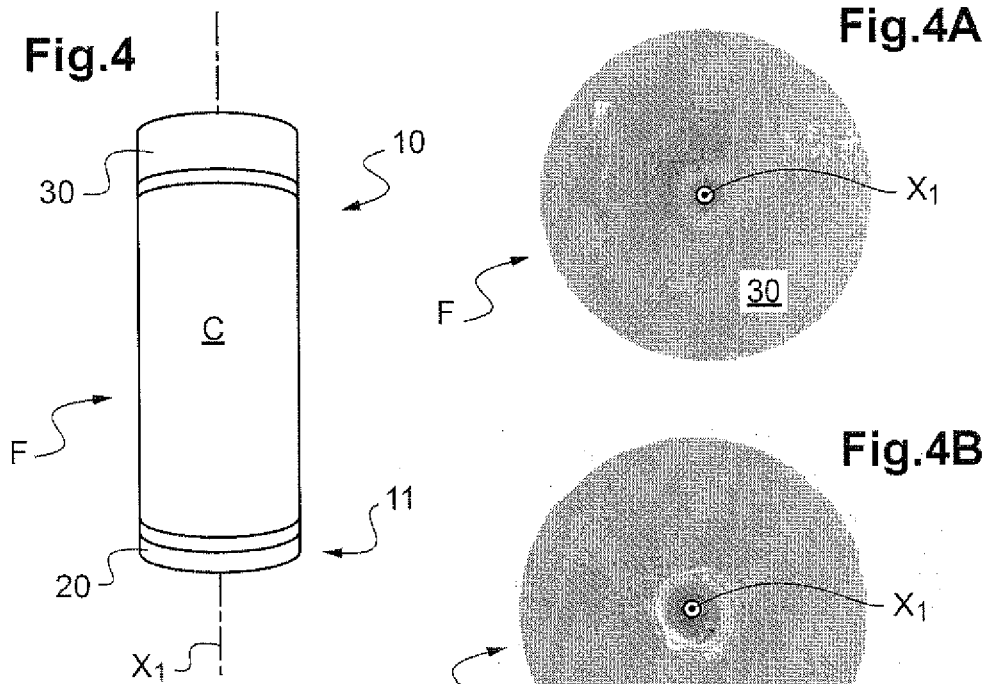
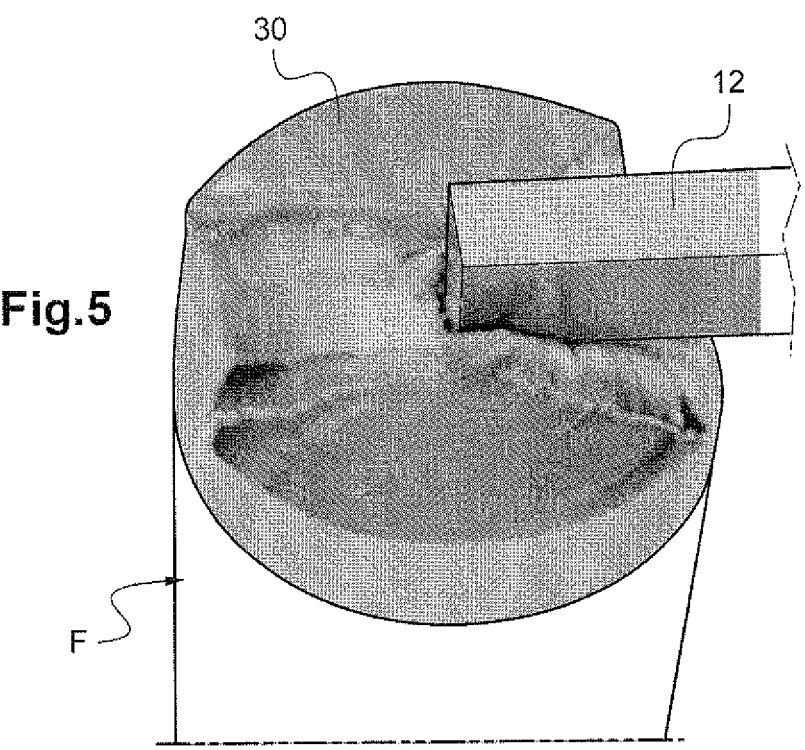

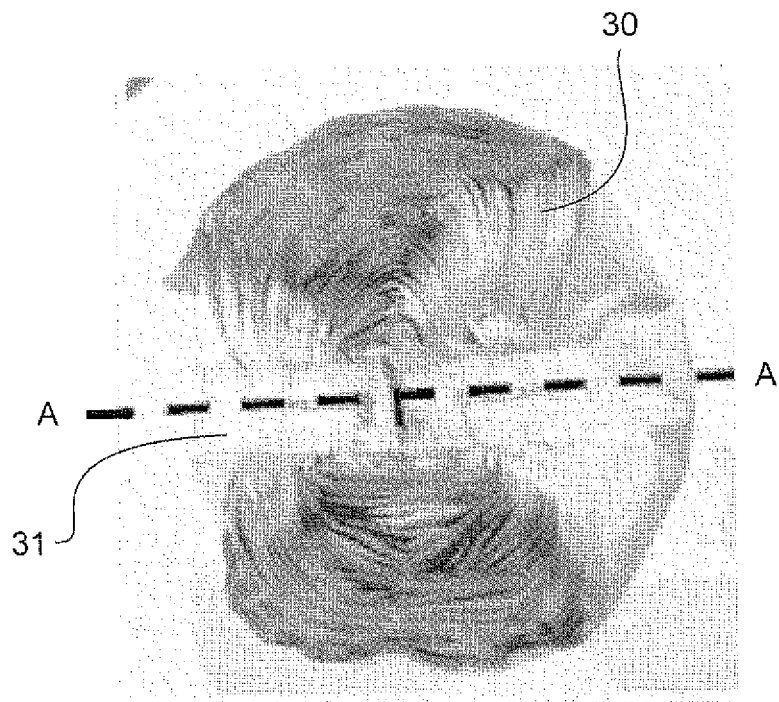
Fig.6
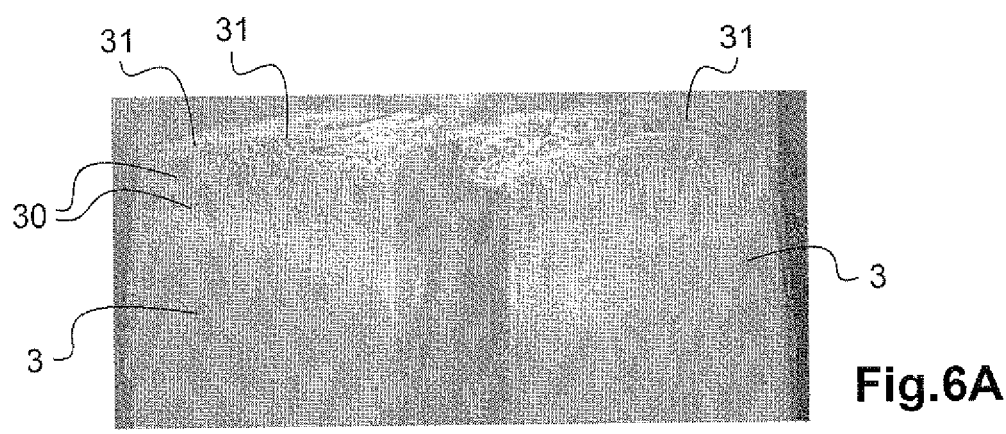
Fig.6A
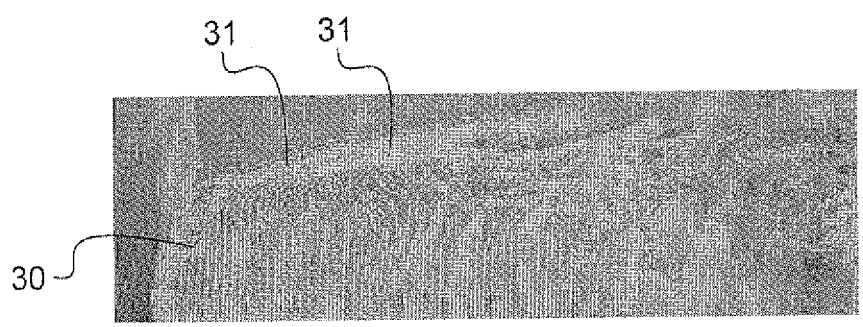
Fig.6A1

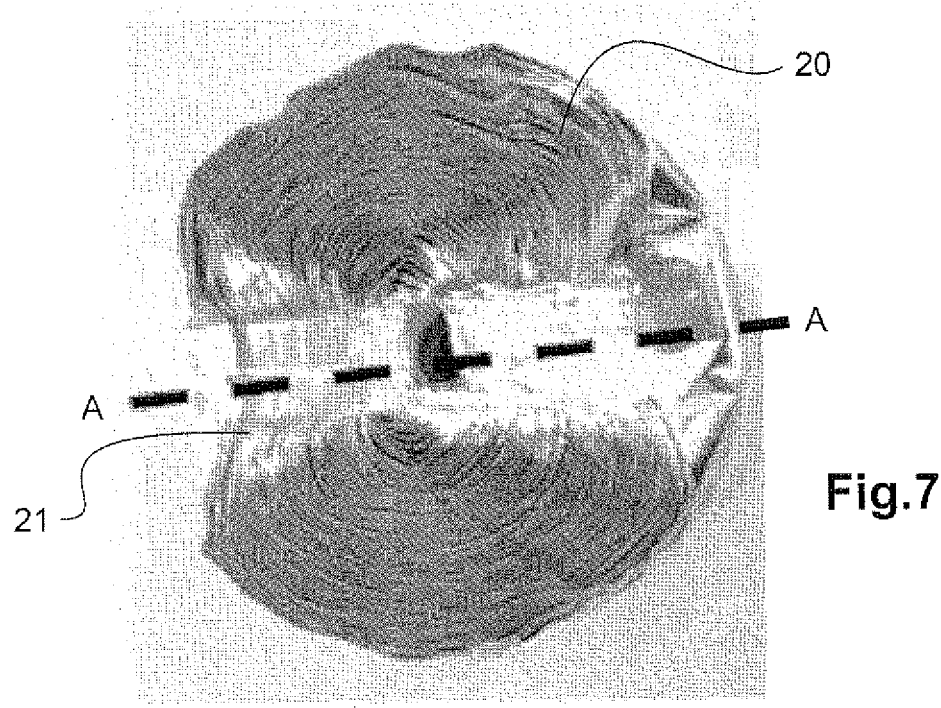
Fig.7
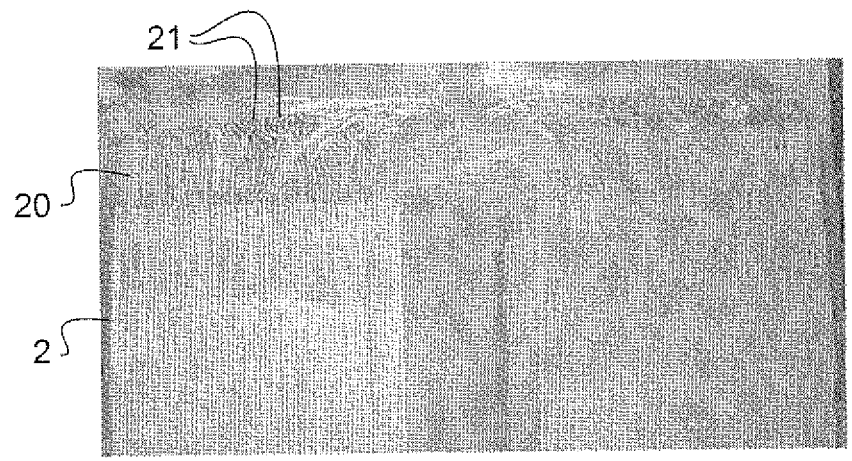
Fig.7A
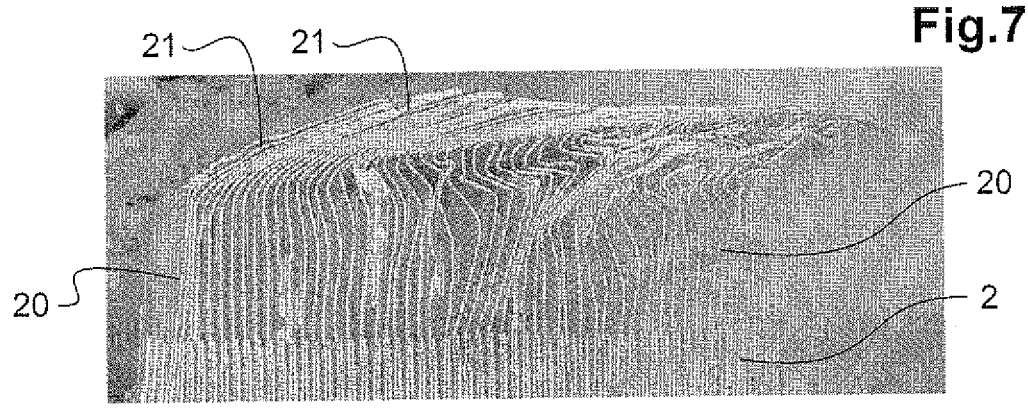
Fig.7A1

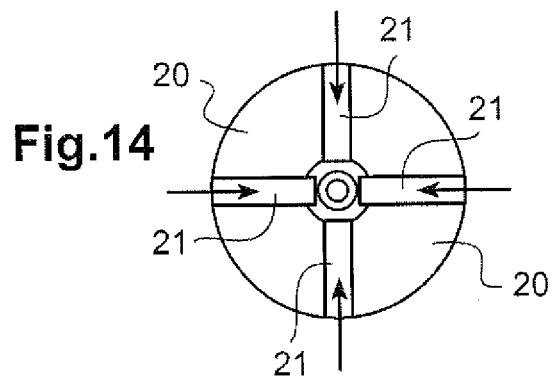
Fig.14
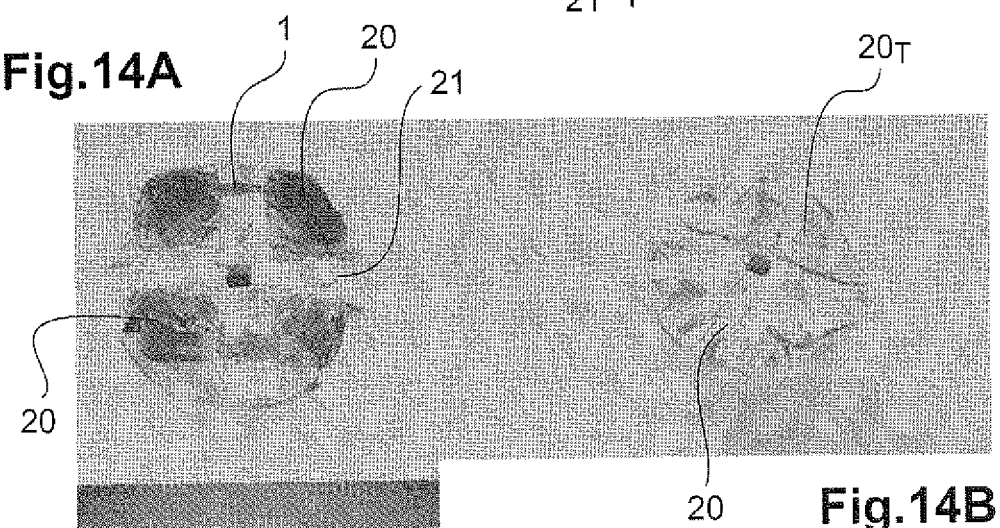
Fig.14A
Fig.14B
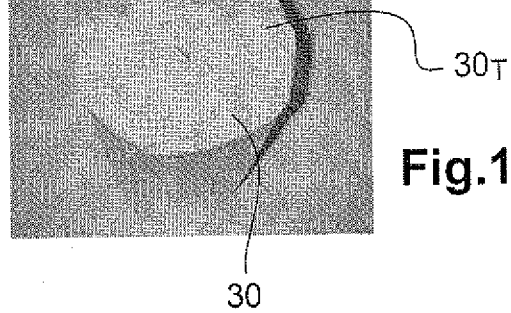
Fig.14C
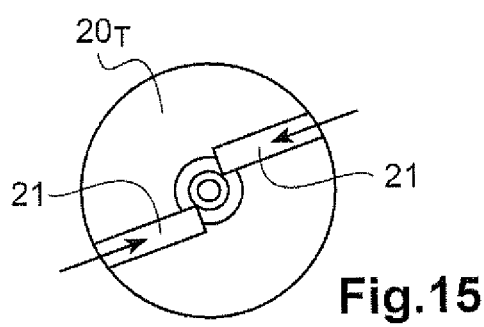
Fig.15
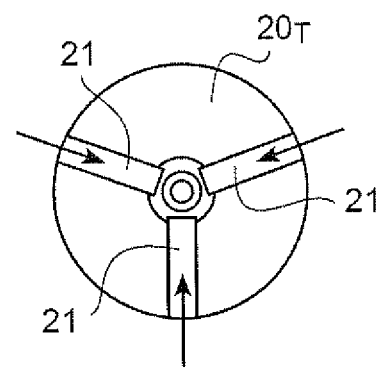
Fig.16

METHOD FOR PRODUCING AN ELECTROCHEMICAL BUNDLE OF A LITHIUM BATTERY

TECHNICAL FIELD

The present invention relates to the field of lithium electrochemical generators, which operate according to the principle of insertion or deinsertion, or in other words intercalation/deintercalation, of lithium in at least one electrode.

More particularly it relates to a lithium electrochemical accumulator including at least one electrochemical cell consisting of an anode and cathode on either side of a separator impregnated with electrolyte, two current collectors one of which is connected to the anode and the other to the cathode, and a casing of a shape that is elongate along a longitudinal axis (X), the casing being arranged to sealably house the electrochemical cell even though a portion of the current collectors forming output terminals, also referred to as poles, passes therethrough.

The separator may consist of one or more films.

The casing may include a cap and a container, usually referred to as a can, or include a cap, a bottom and a lateral jacket joined both to the bottom and to the cap.

The present invention aims to produce an electrical connection portion between at least one electrochemical cell of the accumulator and its output terminals integrated into its casing.

PRIOR ART

Such as schematically illustrated in FIGS. 1 and 2, a lithium-ion accumulator or battery usually includes at least one electrochemical cell C consisting of a separator impregnated with a constituent electrolyte 1 between a positive electrode or cathode 2 and a negative electrode or anode 3, a current collector 4 connected to the cathode 2, a current collector 5 connected to the anode 3 and lastly, a packaging 6 arranged to sealably contain the electrochemical cell even though a portion of the current collectors 4, 5, forming the output terminals, passes therethrough.

The architecture of conventional lithium-ion batteries is an architecture that may be qualified monopolar, because with a single electrochemical cell including an anode, a cathode and an electrolyte. A number of types of monopolar architecture geometry are known:
- a cylindrical geometry such as disclosed in patent application US 2006/0121348;
- a prismatic geometry such as disclosed in patents U.S. Pat. No. 7,348,098 and U.S. Pat. No. 7,338,733; and
- a stacked geometry such as disclosed in patent applications US 2008/060189 and US 2008/0057392 and patent U.S. Pat. No. 7,335,448.

The constituent electrolyte may be a solid, liquid or gel. In the latter form, the constituent may comprise a separator made of a polymer or microporous composite imbibed with organic or liquid-ionic electrolyte(s) that allow lithium ions to move from the cathode to the anode for a charge and vice versa for a discharge, thereby generating the current. The electrolyte is in general a mixture of organic solvents, for example of carbonates, to which a lithium salt, typically $LiPF_6$, is added.

The positive electrode or cathode consists of insertion materials of the lithium cation which are in general composites, such as lithium iron phosphate $LiFePO_4$, lithium cobalt oxide $LiCoO_2$, optionally substituted lithium manganese oxide $LiMn_2O_4$ or a material based on $LiNi_xMn_yCo_zO_2$ where x+y+z=1, such as $LiNi_{0.33}Mn_{0.33}Co_{0.33}O_2$, or a material based on $LiNi_xCo_yAl_zO_2$ where x+y+z=1, $LiMn_2O_4$, $LiNiMnCoO_2$ or lithium nickel cobalt aluminum oxide $LiNiCoAlO_2$.

The negative electrode or anode very often consists of carbon, graphite or is made of $Li_4TiO_5O_{12}$ (titanate material), though also optionally is based on silicon or based on lithium, or based on tin and alloys thereof or of a silicon-based composite.

The anode and the cathode made of lithium insertion material may be deposited using a conventional technique in the form of an active layer on a metal sheet forming a current collector.

The current collector connected to the positive electrode is in general made of aluminum.

The current collector connected to the negative electrode is in general made of copper, of nickel-coated copper or of aluminum.

Conventionally, a Li-ion accumulator or battery uses a pair of materials at the anode and at the cathode that allow it to operate at a high voltage level, typically about 3.6 volts.

A Li-ion accumulator or battery includes a rigid packaging or casing when the targeted applications are constraining or a long lifetime is sought, when for example very high pressures are to be withstood and a stricter seal-tightness level (typically lower than $10^{-6}$ mbar.l/s helium) is required, or in highly constraining environments such as in the spatial or aeronautic field. The main advantage of rigid packagings is that their high seal tightness is maintained over time because the casings are closed by welding, in general by laser welding.

The geometry of most rigid packaging casings of Li-ion accumulators is cylindrical, because most accumulator electrochemical cells are wound by spooling into a cylindrical geometry. Casings of prismatic shapes have also already been produced.

One of the types of cylindrically shaped rigid casings usually manufactured for high-capacity Li-ion accumulators of lifetime longer than ten years is illustrated in FIG. 3.

The casing 6, of longitudinal axis X, includes a cylindrical lateral jacket 7, a bottom 8 at one end, and a cover 9 at the other end. The cover 9 bears the terminals or poles through which the current 40, 50 is output. One of the output terminals (poles), for example the positive terminal 40, is welded to the cover 9, whereas the other output terminal, for example the negative terminal 50, passes through the cover 9 with interposition of a seal (not shown) that electrically insulates the negative terminal 50 from the cover.

FIGS. 4 to 4B show reproductions of photographs of an electrochemical bundle F of a shape that is elongate along a longitudinal axis X1, and including a single electrochemical cell C such as it usually is wound by spooling before the steps of housing in a casing and of electrical connection to the output terminals of the accumulator, and its impregnation with an electrolyte. The cell C consists of an anode 3 and a cathode 4 on either side of a separator (not shown) suitable for being impregnated with electrolyte. As may be seen, one 10 of its lateral ends of the bundle F is bounded by bands 30 of the anode 3 that are not coated, whereas the other 11 of its lateral ends is bounded by bands 20 of the cathode 2 that are not coated.

The expressions "bands that are not coated" and "uncoated bands" are here and in the context of the invention understood to mean the portions of the metal sheets, also referred to as foils, forming the current collectors, that are not covered with a lithium insertion material.

The objective of manufacturers of accumulators is to increase the discharge time of a constituent cell of the accumulator, or their aptitude to be able to operate under high-power regimes, while improving their lifetime, i.e. the number of times they may be cycled, their lightness and the cost of manufacturing these components.

Approaches to improving Li-ion accumulators mainly address the nature of the materials and the methods used to produce electrochemical cell components.

Other less common possible approaches to improvement address the casings of accumulators and the methods and means used to electrically connect an electrochemical bundle to the two output terminals, also referred to as caps or even poles, of different polarity of the accumulator.

At the present time, when it is desired to produce a high-quality electrical connection between the electrochemical bundle and the output terminals of a Li-ion accumulator of cylindrical or prismatic geometry, it is sought to respect as best as possible the following design rules:

- meet the requirements of an application in terms of electrical conduction between each polarity of electrode and the output terminals integrated into the casing of the accumulator, for example with a view to responding to peaks in power while limiting heating inside the accumulator liable to accelerate its electrochemical aging;
- minimize the level of overall internal resistance of the accumulator by making the electrical connection directly to the current collectors of the electrodes for each polarity and by connecting an intermediate connection pad between the electrochemical bundle and the casing of the accumulator;
- simplify the connection to the electrochemical bundle, by making the connection directly to the lateral uncoated electrode bands (also referred to as margins) bounding the two opposite lateral ends of the bundle, respectively;
- optimize the characteristics (thickness, height, weight) and profiles of the lateral uncoated electrode bands for making said electrical connection, in order to as best as possible meet the requirements of the final assembly steps, i.e. the steps of integration of the electrochemical bundle into the casing, of closing the casing of the accumulator, of filling with electrolyte, etc.; and
- minimize the mass and volume required to make the electrical connection which as such is not a generator of electrochemical energy, but that are necessary to transfer energy from the electrochemical bundle to the exterior of the accumulator casing.

As for the literature describing solutions for producing electrochemical bundles for accumulators of cylindrical or prismatic shape and the electrical connection thereof to the output terminals integrated in the casings thereof, mention may be made of the following documents.

Patent FR 2094491 discloses an alkaline accumulator the electrical connection of which between the wound electrochemical cell and output terminals is obtained by cutting regularly spaced slits in the margins of the electrodes, then radially folding the margins thus slit from the exterior of the interior, the margins then taking the form of superposed lamina forming a substantially flat plinth to which a current collector that, depending on the circumstances, may be the cover of the casing, is lastly welded.

Patent application EP 1102337 discloses a Li-ion accumulator the electrical connection of which between the wound electrochemical cell and output terminals is obtained by pressing once each end of the electrode layers of the wound cell, along the winding axis, by means of a pressing tool then, by laser welding of each end of the electrode layers to a terminal current collector consisting of a plate taking the form of a disk and a connecting tongue itself subsequently laser welded to the cover of the casing, at one end, and to the casing bottom, at the other end. Ribs are produced each over a diameter of the disk and are themselves pressed before the welding against the pressed electrode layer ends.

Patent application EP 1596449 describes a Li-ion accumulator the electrical connection of which between the wound electrochemical cell and output terminals is obtained firstly by multiple pressing of each lateral end bounded by uncoated electrode bands of the wound cell, by means of a pressing tool of outside diameter comprised between 15 and 20 mm. The pressing tool moves over a very small distance alternatively from the exterior toward the interior of the cell parallel to the winding axis while travelling round the entire lateral area of the uncoated electrode bands in order to make the latter overlap and form a dense flat plinth to which is laser or transparency welded a terminal current collector consisting of a foil taking the form of a flat connection band, itself laser or transparency welded subsequently to an output terminal integrated into the cover at one lateral end and to the casing bottom, at the other lateral end.

On analyzing all the known solutions for producing the electrochemical bundle of a lithium accumulator and its electrical connection to the output terminals of the accumulator, such as described above, the inventors came to the conclusion that said solutions were still perfectible in many ways.

Firstly, the weight and volume of the lateral uncoated electrode bands (margins) required for the electrical connection with the current collectors according to the prior art are not necessarily optimized, thereby implying that the weight and volume of the accumulator will in the end also not be optimized.

Next, the inventors observed that de facto the margins of a given lateral end are not necessarily electrically connected together, in particular those portions of these margins which are located in the most peripheral zone of the bundle. This implies an electrochemical bundle of decreased actual capacity per unit weight, this possibly being detrimental in particular in high-power accumulator applications.

Lastly, the step of filling a lithium accumulator electrochemical bundle with electrolyte may prove to be relatively long and tricky because the current collectors according to the prior art, such as they are welded to the accumulator electrochemical bundle margins, form a substantial obstacle to passage of the electrolyte.

There is therefore a need to improve the production of the electrochemical bundle of a lithium accumulator and its electrical connection to the output terminals of the accumulator, especially with a view to decreasing the electrochemical bundle weight and volume required for the electrical connection and increasing the actual capacity per unit weight of the bundle, and with a view to making the step of filling with an electrolyte less long and tricky.

The aim of the invention is to at least partially meet this need.

SUMMARY OF THE INVENTION

To this end, the invention relates, under one of its aspects, to a process for producing an electrochemical bundle (F) of a lithium accumulator (A), such as a Li-ion accumulator, with a view to its electrical connection to the output terminals of the accumulator, including the following steps:

a/ providing an electrochemical bundle including at least one electrochemical cell consisting of a cathode and an anode on either side of a separator suitable for being impregnated with an electrolyte, the bundle having a shape that is elongate along a longitudinal axis X1, having, at one of its lateral ends, anode bands that are not coated and, at the other of its lateral ends, cathode bands that are not coated;

b/ folding with plastic deformation, at least in a direction radial to the axis X1, a portion of the bands from the exterior to the interior of the electrochemical bundle, onto an area portion of at least one of the lateral ends so that at least two consecutive bands overlap in their folded portion and so that the folded portions that overlap form a substantially flat area; and c/ axial tamping along the axis X1 of the bands of the electrochemical bundle, of at least the area portion of the lateral end that is not folded in step b/, the axial tamping being carried out repeatedly so as to obtain in the tamped and not folded area portion of the lateral end, a substantially flat plinth intended to be welded to a current collector.

The expression "folding with plastic deformation" is to be understood in its conventional sense, i.e. folding generating an irreversible deformation.

Thus, the process according to the invention is characterized by the combination of two steps b/ and c/ of bending a lithium accumulator electrochemical bundle, which steps are distinct in their implementation and allow two separate zones to be obtained at at least one, and preferably each, of the lateral ends of the bundle.

These two separate zones work together to improve the electrical connection to a current collector while decreasing the weight and volume of the required lateral uncoated bands (margins).

Thus, the folded band portions are welded together, thereby making it possible to systematically ensure a uniform distribution of the electric current and a better actual capacity per unit weight from the bundle during operation of the accumulator. Specifically, when the folded band portions are welded together, all the wound turns of electrodes of a given polarity in the bundle are connected, from the exterior to the interior of the bundle, together to a given electrical connection line. Thus, the points of electrical connection to a lateral end of a given electrode are multiplied over its entire area, and this as close as possible to the active lithium insertion material, this achieving a proportional decrease in the distance between connection points over the length of the electrode.

The folded band portions also make it possible to confer rigidity on one lateral end of the bundle, thereby facilitating the subsequent step of placing and welding the current collector to this end.

The tamped band portions that have not been folded beforehand form, for their part, the actual plinth for connecting to the current collector. As mentioned above, the plinth is rigidified by the folded band portions. The inventors have observed that a substantial densification of the tamped band portions is obtained because of this rigidification. In other words, comparatively to a step of tamping alone according to the prior art, the step b/ of folding combined with the step c/ of axial tamping contributes to increase the densification of the lateral-end band portions.

By virtue of the invention, it is therefore possible, to use lateral uncoated electrode bands of lower weight and smaller volume and therefore to increase the actual capacity per unit weight of the electrochemical bundle.

Thus, according to the invention, with a very good electrical interconnection of the folded band portions by systematic welding and a high densification of the tamped band portions, it is possible to substantially increase the actual capacity per unit weight of the electrochemical bundle of a lithium accumulator.

By virtue of the invention, the inventors think that it is possible to increase the capacity per unit weight of a Li-ion accumulator by about 10% relative to the prior art.

Lastly, the electrical connection plinth obtained according to the process according to the invention, is located away from the folded band portions, i.e. raised relative thereto. This height difference between the folded band portions and plinth therefore creates a volume devoid of material that will facilitate and accelerate the passage of the electrolyte into the electrochemical bundle in the subsequent step of electrolyte injection. The substantially flat plinth obtained by axial tamping in step c/ is not necessarily coplanar with the area obtained by the folding in step b/. Thus, in general, there is a height difference between the flat plinth and the surface of the folded portions. This height difference may typically be comprised between 0.2 and 2 mm.

According to one advantageous embodiment, the folding in step b/ and the axial tamping in step c/ are carried out at each of the lateral ends.

The thickness of the band portions folded onto a lateral end may be smaller than 0.6 mm.

According to one advantageous variant, the axial tamping in step c/ is carried out on the entire area of a lateral end of the bundle.

According to one advantageous embodiment, the electrochemical bundle consists of a single electrochemical cell wound upon itself by spooling.

According to a first folding embodiment, the folding in step b/ may be carried out along at least one straight line passing through the center of the roll of the cell.

It may thus be carried out along two straight lines passing through the center of the roll of the cell, the two straight lines being aligned with one another. More generally, it may be a question of two straight lines passing through the center and making an angle comprised between 150 and 210° to each other.

It may also be carried out along three straight lines passing through the center of the roll of the cell, the three straight lines being spaced apart angularly by 120°. More generally, it may be a question of three straight lines passing through the center and making an angle comprised between 90 and 150° to each other.

It may also be carried out along four straight lines passing through the center of the roll of the cell, the four straight lines being angularly spaced by 90°. More generally, it may be a question of four straight lines passing through the center and making an angle comprised between 70 and 110° to each other.

According to a second folding embodiment, the folding in step b/ may be carried out along at least one straight line not passing through the center of the roll of the cell.

According to one advantageous embodiment, a step d/ is carried out of welding together folded band portions of a given lateral end.

Preferably, the welding step d/ is carried out between the step b/ of radial folding and the step c/ of axial tamping.

The welding step d/ may consist in obtaining a weld by ultrasonic, electric or laser welding.

The invention also relates under another of its aspects to a process for producing an electrical connection portion between an electrochemical bundle (F) of a lithium accumulator (A) and one of the output terminals of the accumulator, including the following steps:

producing an electrochemical bundle (F) according to the process just described;

welding together folded band portions of the electrochemical bundle of a given lateral end according to step d/; and welding the plinth obtained to a current collector itself intended to be electrically connected or coupled to an output terminal of the accumulator.

According to one advantageous embodiment, the welding step d/ and the step of welding the plinth to a current collector are carried out simultaneously.

Preferably, prior to the simultaneous welding steps, a current collector is brought into contact against the plinth, the current collector including:

one or more contact ribs suitable for making contact against the plinth; and one or more apertures bounded by holding tabs suitable for holding in place the folded band portions of the electrochemical bundle.

More preferably, the simultaneous welding steps are carried out by laser welding.

Yet another subject of the invention according to another of its aspects, is a current collector, especially intended to be employed in the process described above, including:

one or more contact ribs suitable for making contact against a plinth formed by the axially tamped and not folded band portions of a lateral end of an electrochemical bundle; and one or more apertures bounded by holding tabs suitable for holding in place the folded band portions of said lateral end of said electrochemical bundle.

The invention lastly relates to a lithium-ion (Li-ion) battery or accumulator including a casing including:

a bottom to which is welded one of the current collectors welded to the electrochemical bundle according to the process described above; and a cover with a feedthrough forming an output terminal to which is welded the other of the current collectors welded to the electrochemical bundle according to the process described above.

Preferably:

the material of the negative electrode(s) is chosen from the group including graphite, lithium, titanate oxide $Li_4TiO_5O_{12}$; or based on silicon or based on lithium, or based on tin and alloys thereof; and the material of the positive electrode(s) is chosen from the group including lithium iron phosphate $LiFePO_4$, lithium cobalt oxide $LiCoO_2$, optionally substituted lithium manganese oxide $LiMn_2O_4$ or a material based on $LiNi_xMn_yCo_zO_2$ where $x+y+z=1$, such as $LiNi_{0.33}Mn_{0.33}Co_{0.33}O_2$, or a material based on $LiNi_x Co_yAl_zO_2$ where $x+y+z=1$, $LiMn_2O_4$, $LiNiMnCoO_2$ or lithium nickel cobalt aluminum oxide $LiNiCoAlO_2$.

DETAILED DESCRIPTION

Other advantages and features of the invention will become more clearly apparent on reading the detailed non-limiting and illustrative description of exemplary embodiments of the invention given with reference to the following figures, in which:

FIG. 4 is a photographic perspective view of an electrochemical bundle of a lithium-ion accumulator according to the prior art, the bundle consisting of a single electrochemical cell wound upon itself by spooling;

FIG. 4A is a photographic top view of a lateral end of the electrochemical bundle in FIG. 4;

FIG. 4B is a photographic top view of the other lateral end of the electrochemical bundle in FIG. 4;

FIG. 5 is a photographic perspective view of an electrochemical bundle of a lithium-ion accumulator according to the invention, showing how the step of folding one of the lateral ends of the bundle according to the process according to the invention is carried out;

FIG. 6 is a photographic top view of a lateral end of a bundle on which the folding step in FIG. 5 has been carried out;

FIG. 6A is a photographic cross-sectional view along the axis A-A of the bundle in FIG. 6;

Figure 1:
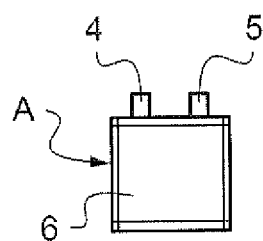
FIG. 1 is an exploded schematic perspective view showing various elements of a lithium-ion accumulator.
Figure 2:
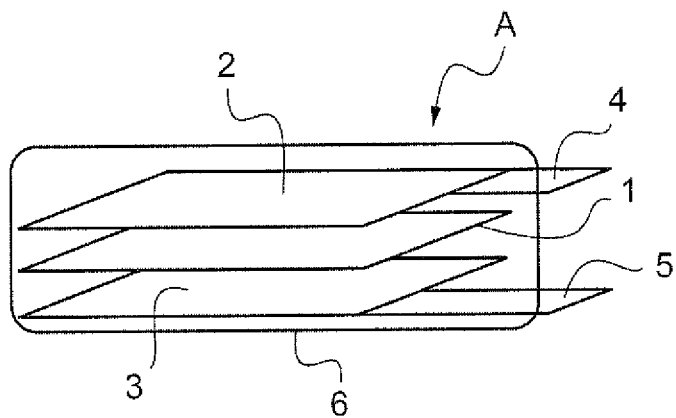
FIG. 2 is a front view showing a lithium-ion accumulator with its flexible packaging according to the prior art.
Figure 3:
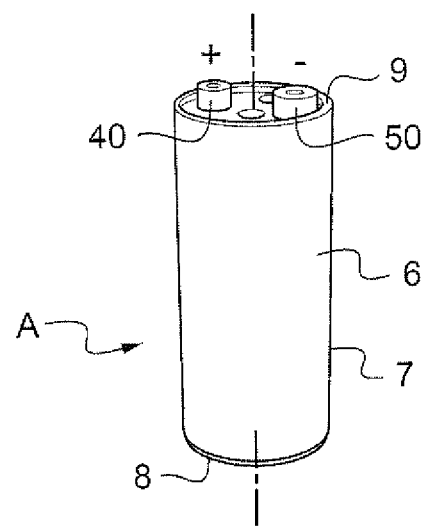
FIG. 3 is a perspective view of a lithium-ion accumulator according to the prior art with its rigid packaging consisting of a casing.
Figure 8A:
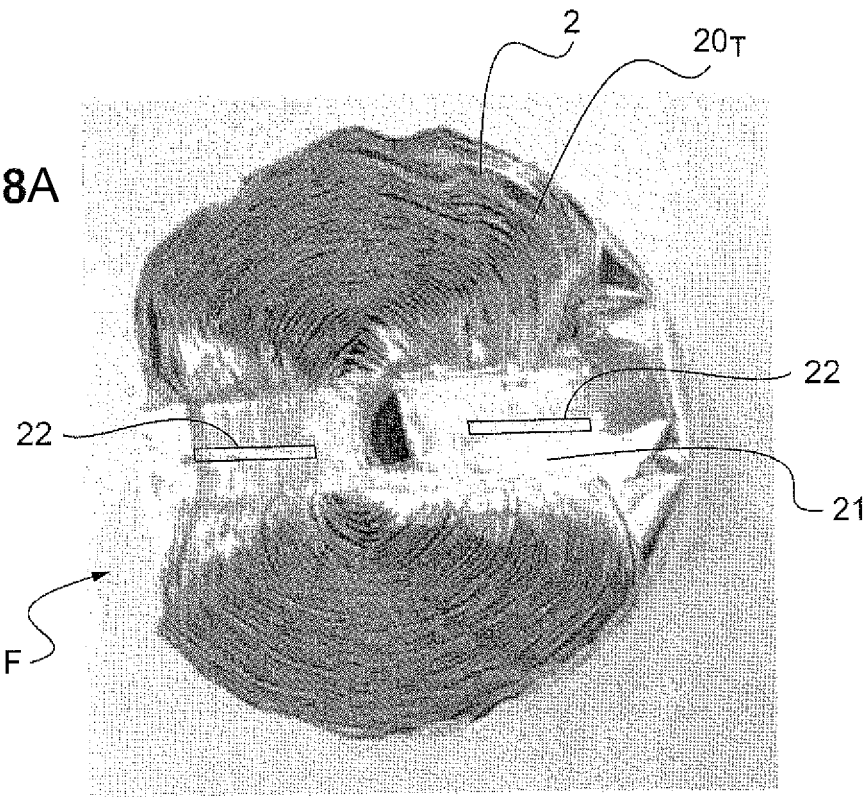
Figure 8B:
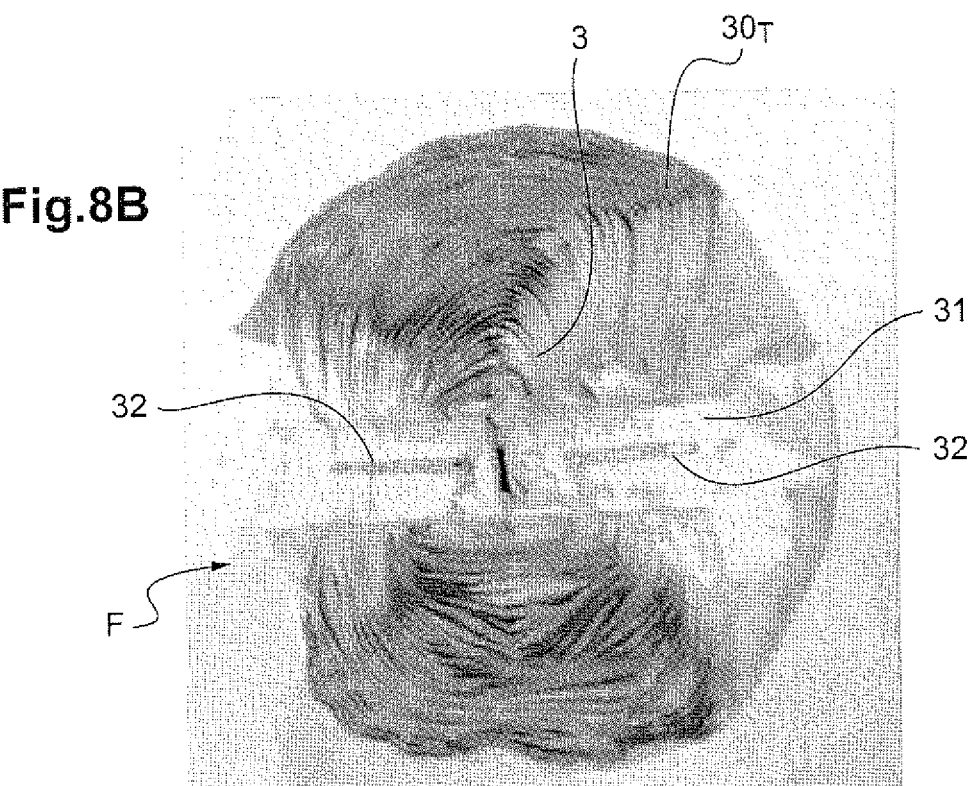
Figure 9:
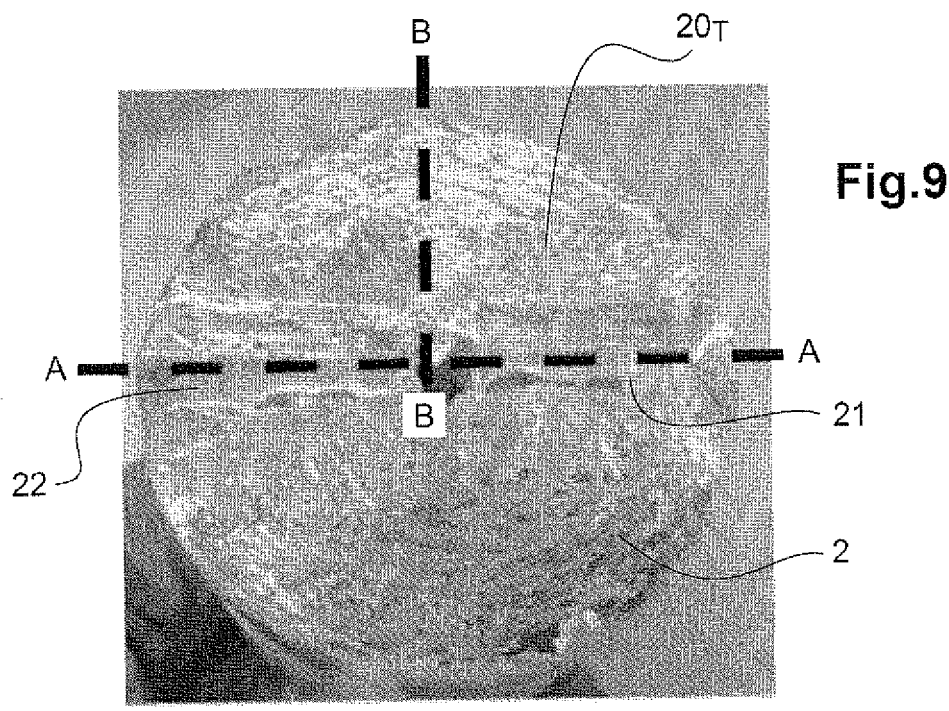
Figure 9A:
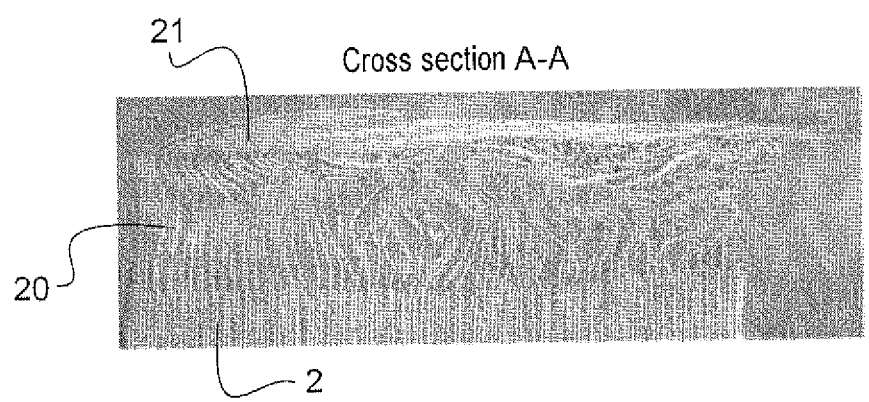
Figure 9B:
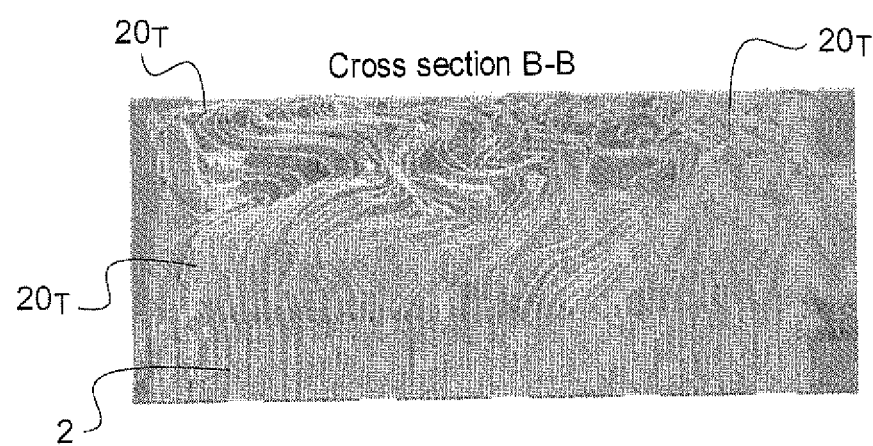
Figure 10:
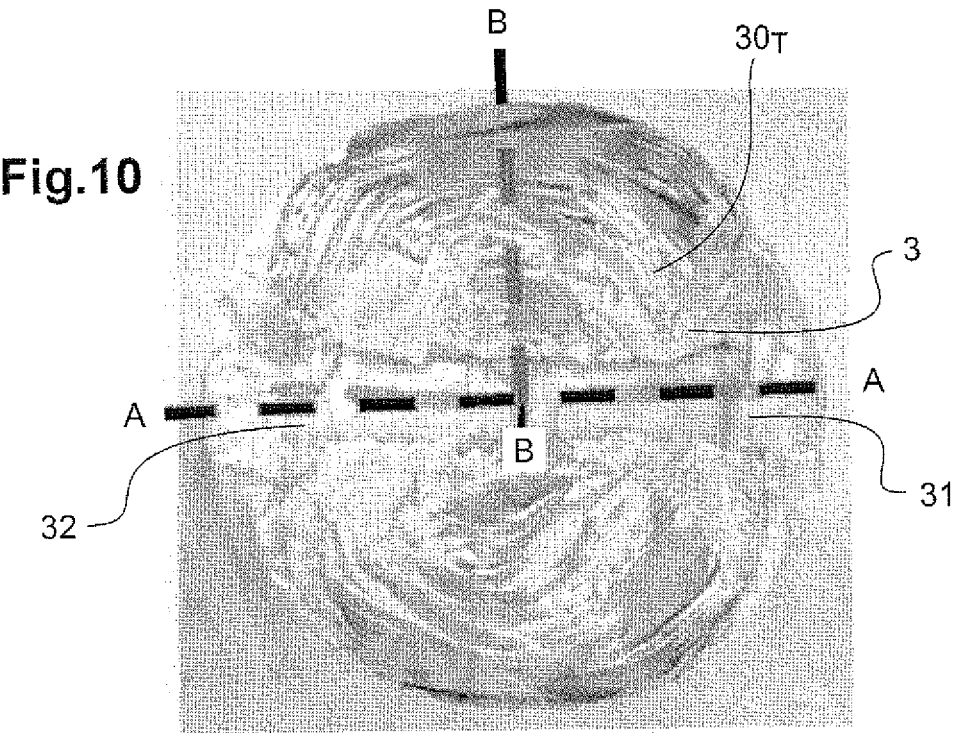
Figure 10A:
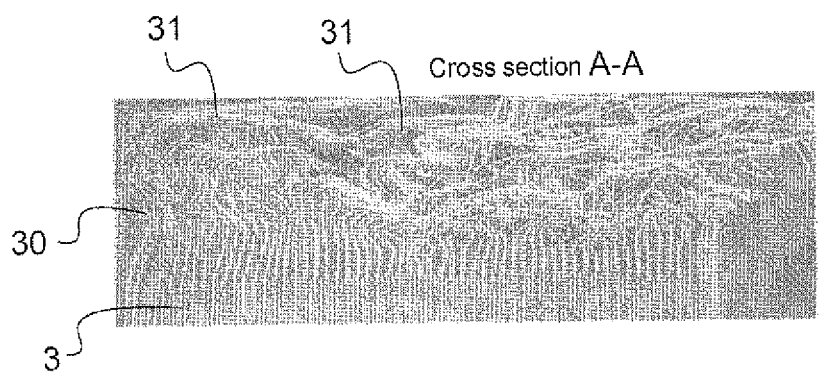
Figure 10B:
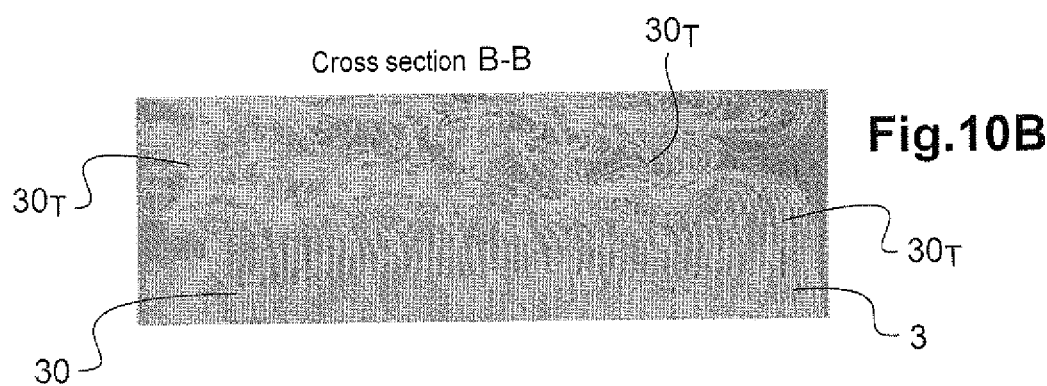
Figure 11B:
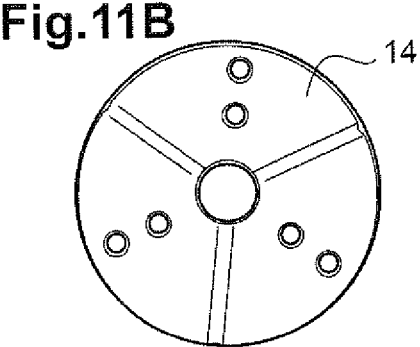
Figure 11D:
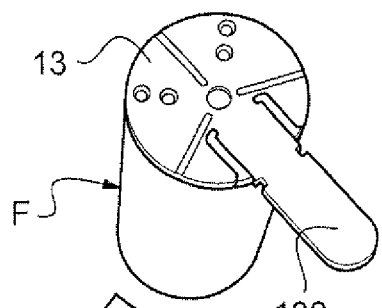
Figure 11:
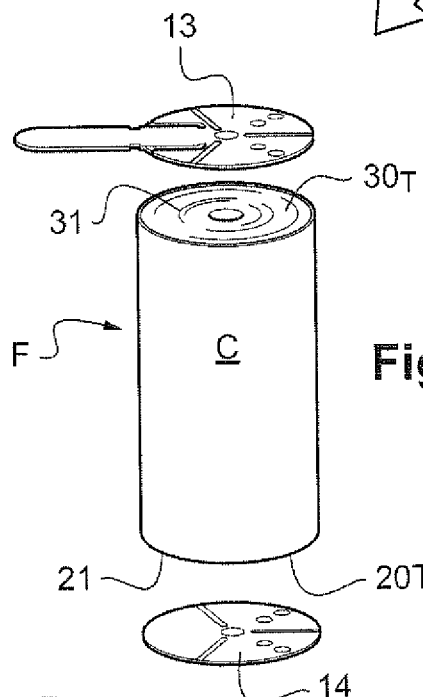
Figure 11A:
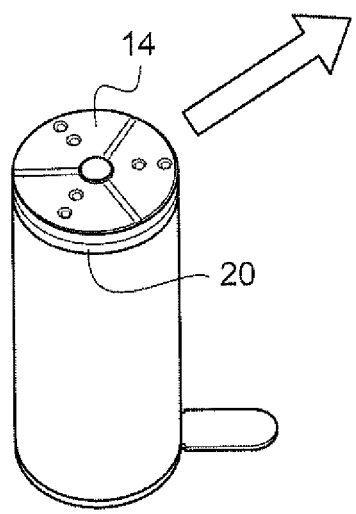
Figure 11C:
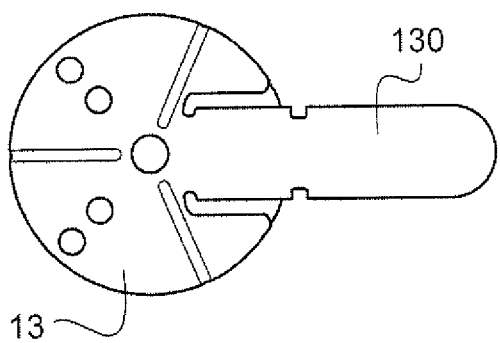
Figure 12A:
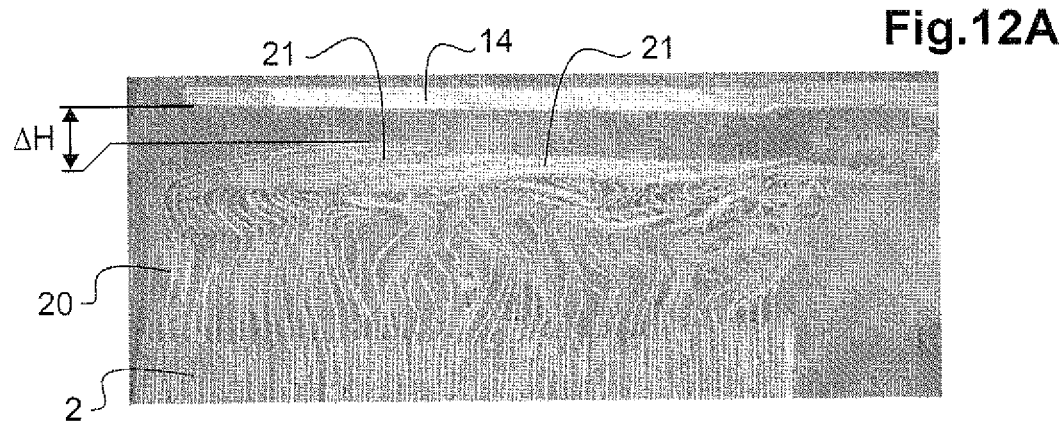
Figure 12B:
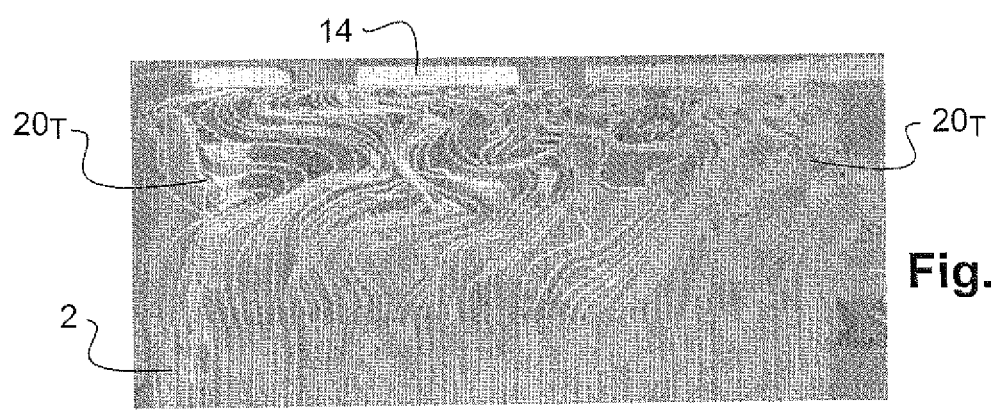
Figure 13A:
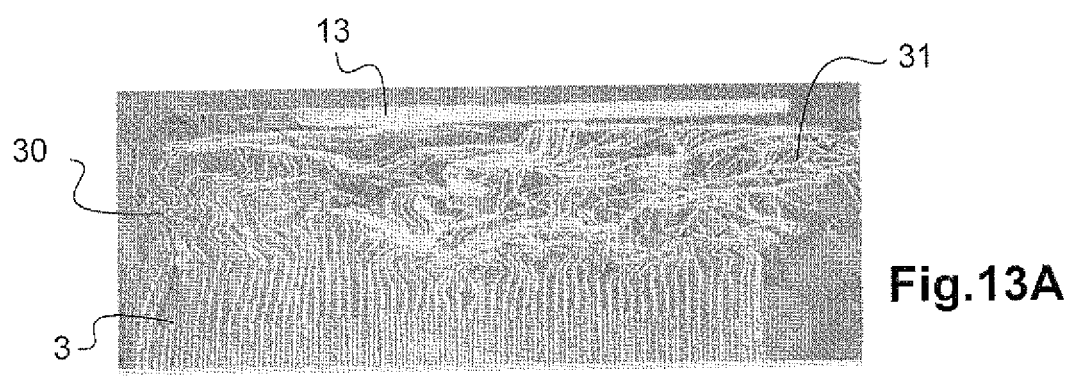
Figure 13B:
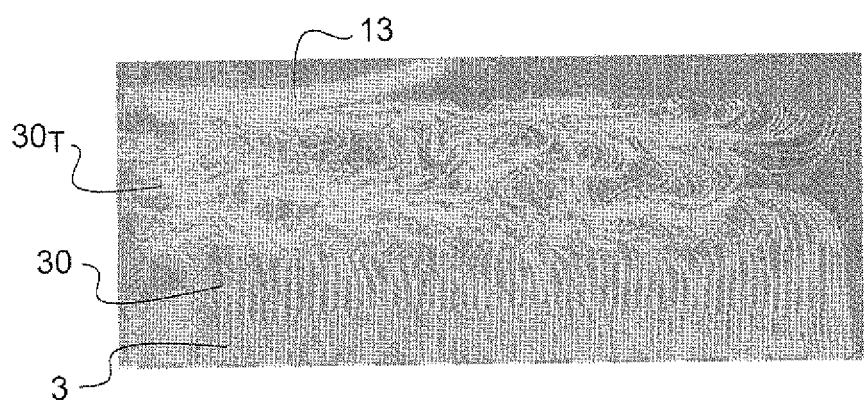
Figure 17:
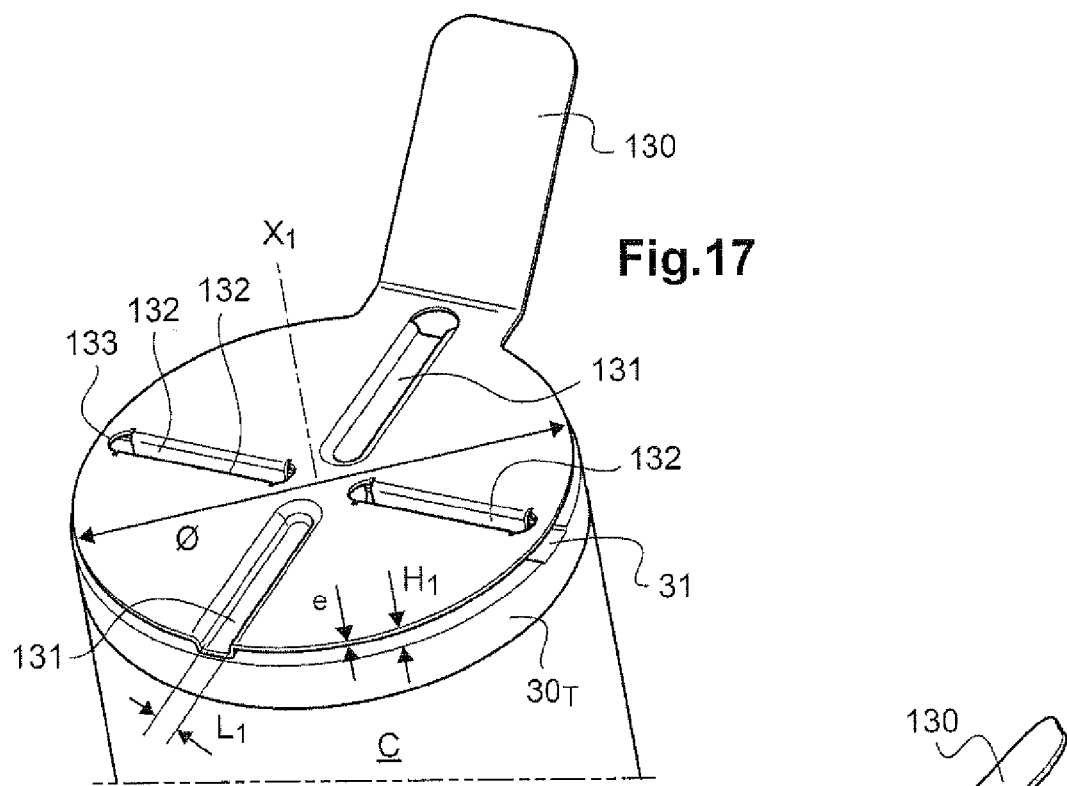
Figure 18:
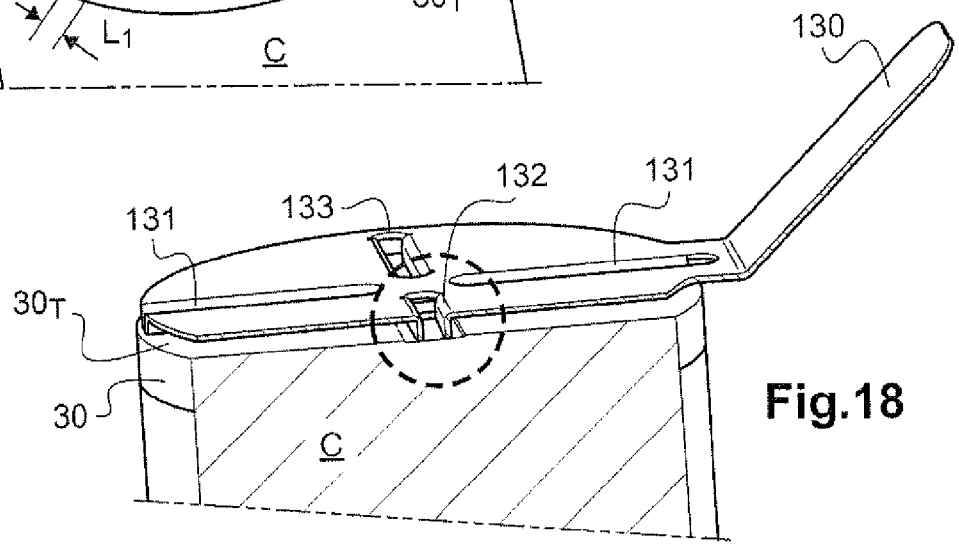
Figure 18A:
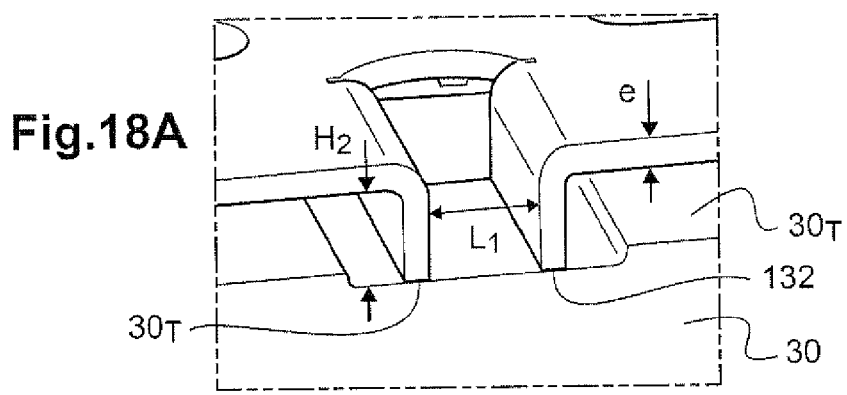

FIG. 6A1 is an enlarged photographic view of FIG. 6A;

FIG. 7 is a photographic top view of the other lateral end of a bundle on which the step of folding in FIG. 5 has been carried out;

FIG. 7A is a photographic cross-sectional view along the axis A-A of the bundle in FIG. 7;

FIG. 7A1 is an enlarged photographic view of FIG. 6A;

FIGS. 8A and 8B are photographic top views of the bundle in FIGS. 6 and 7, respectively, with the folded portions welded together with a continuous weld;

FIG. 9 is a photographic top view of the lateral end of the bundle in FIG. 8A, on which end the step of axial tamping according to the process according to the invention has furthermore been carried out;

FIG. 9A is a photographic cross-sectional view along the axis A-A of the bundle in FIG. 9;

FIG. 9B is a photographic cross-sectional view along the axis B-B of the bundle in FIG. 9;

FIG. 10 is a photographic top view of the lateral end of the bundle in FIG. 8B, on which end the step of axial tamping according to the process according to the invention has furthermore been carried out;

FIG. 10A is a photographic cross-sectional view along the axis A-A of the bundle in FIG. 10;

FIG. 10B is a photographic cross-sectional view along the axis B-B of the bundle in FIG. 10;

FIGS. 11 and 11A to 11D are photographic views showing in perspective and viewed from above each of the two current collectors welded to one of the lateral ends of a bundle produced according to the process according to the invention;

FIGS. 12A and 12B are photographic cross-sectional views showing one of the two current collectors welded to one of the lateral ends of a bundle as in FIGS. 11 and 11A to 11D;

FIGS. 13A and 13B are photographic cross-sectional views showing the other of the two current collectors welded to one of the lateral ends of a bundle as in FIGS. 11 and 11A to 11D;

FIG. 14 is a schematic top view of a lateral end of a bundle, said end being produced according to a variant of the folding step of the process according to the invention;

FIGS. 14A and 14B are photographic perspective views of a lateral end of a bundle (said end being produced according to the variant in FIG. 14) before and after the axial tamping step of the process according to the invention, respectively;

FIG. 14C is a photographic perspective view of the other lateral end of a bundle (said end being produced according to the variant in FIG. 14) after the axial tamping step of the process according to the invention;

FIGS. 15 and 16 are schematic top views of a lateral end of a bundle, said end being produced according to two other variants of the folding step of the process according to the invention;

FIG. 17 is a perspective view of one embodiment of the electrical connection portion between the bundle obtained according to the process according to the invention and a current collector itself intended to be electrically connected to an output terminal of the accumulator;

FIG. 18 is a longitudinal cross-sectional view of the electrical connection portion in FIG. 17;

FIG. 18A is a view of a detail of FIG. 18; and

FIGS. 19A to 19E are top views showing various variants of welds between the folded portions of a bundle obtained according to the invention.

For the sake of clarity, the same references designating the same elements of a lithium-ion accumulator according to the prior art and according to the invention are used for all the FIGS. 1 to 19E.

It will be noted that the various elements according to the invention are shown only for the sake of clarity and they are not to scale.

FIGS. 1 to 4B have already been commented upon in detail in the preamble. They are therefore not described below.

To improve the electrical connection between an electrochemical bundle of a Li-ion accumulator and its output terminals, the inventors propose a new process for producing the electrochemical bundle.

The metal layers bearing the electrode materials may have a thickness comprised between 5 and 50 µm. For an anode layer 3, in may advantageously be a question of a copper layer of thickness of about 12 µm. For a cathode layer 2, it may advantageously be a question of an aluminum layer of thickness of about 20 µm.

With reference to FIGS. 5 to 11, the various steps of this producing process according to the invention will now be described.

Step a/: The anode, the cathode and at least one separator film of the electrochemical cell C are wound by spooling around a supporting member (not shown).

The bundle therefore has a cylindrical shape that is elongate along a longitudinal axis X1, having, at one 10 of its lateral ends, bands 30 of the anode 3 that are not coated and, at the other 11 of its lateral ends, bands 20 of the cathode that are not coated. The initial bundle according to the invention is therefore as that shown in FIGS. 4 to 4B.

Step b/: Next, a portion of the bands is folded with plastic deformation, from the exterior to the interior of the electrochemical bundle F, onto an area portion of each lateral end at least in a direction radial to the axis X1.

The folding may be achieved by means of a bar 12 by radially pivoting the bundle F as shown in FIG. 5 on the lateral end bounded by the uncoated anode bands 30.

As may be clearly seen in FIGS. 6 to 6A1, at the lateral end 10 of the bundle F, a plurality of consecutive anode bands 30 that overlap in their folded portion 31 is thus obtained and the folded portions 31 that overlap form a substantially flat area.

The same goes for the other lateral end 11 of the bundle F, the plurality of consecutive cathode bands 20 overlapping in their folded portion 21 and the overlapping folded portions 21 that overlap fanning a substantially flat area (FIGS. 7 to 7A1).

Preferably, the thickness of the band portions 21 or 31 folded onto a lateral end 11 or 10 is smaller than 0.6 mm.

Step c/: The bands 20, 30 of the electrochemical bundle are then axially tamped along the axis X1, over the entire area of the lateral ends 10, 11.

The axial tamping consists in compressing with a flat or structured tool with a bearing surface of area substantially equal to the area of each of the lateral ends of the bands 20 or 30.

When the geometry sought for the accumulator is cylindrical, the tool and the electrochemical bundle are placed coaxially during the axial tamping.

The axial tamping is carried out once or repeatedly. It may consist of compressing followed by one or more relative reciprocal movements, i.e. at least one there-and-back movement along the axis X1 of the bundle, until either the size desired for the bundle along X1, or a maximum compressive stress, the value of which is set beforehand, has been obtained.

Thus, in the tamped and not folded area portion 20T, 30T of each lateral end, a substantially flat plinth, intended to be welded to a current collector, is obtained.

Thus, as may clearly be seen in FIGS. 10 to 10B, there is obtained, at the lateral end 10 of the bundle F:

in a portion of the area thereof, a plurality of consecutive anode bands 30 that overlap in their folded portion 31, the folded portions 31 that overlap forming a substantially flat area; and in the other portion of its area, a band portion 30 with an area 30T that is tamped and not folded, which forms a substantially flat plinth that is intended to be welded to a current collector.

The same goes at the other lateral end 11 of the bundle F, having:

in a portion of the area thereof, a plurality of consecutive cathode bands 20 that overlap in their folded portion 21, the folded portions 21 that overlap forming a substantially flat area; and in the other portion of its area, a band portion 20 with an area 20T that is tamped and not folded, which forms a substantially flat plinth that is intended to be welded to a current collector (FIGS. 9 to 9B).

As is more easily seen in FIGS. 12A and 12B, the two area portions are not necessarily coplanar. The substantially flat folded area portion 21 is in general located in a plane below that of the flat plinth delimited by the tamped area portion 20T. The height difference ΔH between these two area portions 20T, 21 may be comprised between 0.2 and 2 mm.

Step d/: The folded band portions 21 or 31 of a given lateral end 11 or 10 are welded together.

According to a first advantageous embodiment, this welding step d/ is carried out between the step b/ of radial folding and the step c/ of axial tamping that have just been described.

As may be seen in FIGS. 8A and 8B, the folded portions 31 or 21 may thus advantageously be welded together by means of a continuous weld 32 or 22.

According to this first embodiment, at one of the lateral ends 11 of the bundle, the plinth formed by the tamped portion 20T of the cathode (positive margins) is then welded to a conventional current collector 14 taking the form of a solid disk, itself intended to be subsequently welded to the bottom 8 of the accumulator casing 6 (FIGS. 11, 11A and 11B).

The procedure is the same at the other of the lateral ends 10 of the bundle, the plinth formed by the tamped portion 30T of the anode (negative margins) being welded to a conventional current collector portion 13 taking the form of a solid disk drilled at its center and a tongue 130 projecting laterally from the disk 13 (FIGS. 11, 11C and 11D).

Alternatively, according to a second embodiment, the welding step d/ and the step of welding each of the plinths are carried out simultaneously by means of a specially designed current collector, after step c/.

Such as illustrated in FIGS. 17 to 18A, the specially designed current collector 13, which is preferably made of aluminum or copper, firstly includes contact ribs 131 suitable for making contact against a plinth formed by the tamped portion 30T of the anode bands 30. It also includes apertures bounded by holding tabs 132 suitable for holding in place the folded band portions 31. As illustrated, the ribs 131 and the holding tabs 132 are produced on the same side of the disk of the collector 13 or in other words project from the same main face of the disk 13.

Preferably, the apertures bounded by the holding tabs 132 are closed at their periphery 133.

By way of example, the current collector 13 has a diameter Ø that is comprised between 1 and 10 cm, and a plate thickness e comprised between 0.2 and 1.2 mm, the contact ribs 131 have a height H1 comprised between 0.1 and 2 mm and a width L1 comprised between 0.5 and 10 mm, and the holding tabs 132 have a height H2 comprised between 0.2 and 2 mm and define pairwise apertures of a width comprised between 1 and 10 mm.

Thus, before the welding is carried out, the current collector 13 is positioned, i.e. brought into contact, against the lateral end 10, the tabs 132 holding the folded band portions 31 in place and the ribs 131 making contact against the plinth formed by the tamped portion 30T (FIGS. 17 to 18A) without engendering additional plastic deformation of the plinth 30T.

The ribs 131 thus have the function, in addition to providing the collector 13 with rigidity, of precisely localizing the contact between the collector 13 and the tamped portion 30T.

Next, continuous weld traces are produced, on the one hand, on the ribs 131 in order to weld the collector 13 and the tamped portion 30T together, and on the other hand, through the apertures bounded by the tabs 132 in order to weld the held folded portions 31 together.

During the welding, the ribs 131 facilitate removal of the heat to the periphery of the weld bead.

Independently of how the aforementioned welds are produced, a conventional procedure is followed to finalize the definitive accumulator.

Thus, although not shown, the bundle is introduced with the collector 13 into a rigid container made of aluminum forming only the lateral jacket 7 of the casing 6. Care is in particular taken in this step to ensure that the tongue 130 does not hinder the introduction. To this end, the tongue is advantageously bent upward.

The collector 14 is welded to the bottom 8 of the casing 6.

The collector 13 is welded to a negative pole 50 forming a feedthrough of a cover 9 of the casing 6.

The cover 9 is then welded to the rigid metal container 7.

Next, a step of filling the casing 6 is carried out using an electrolyte, through a through-aperture (not shown) that is arranged in the cover 9.

According to the invention, because of the height difference between the plinth formed by the tamped portion 30T and the folded portions 31, the filling with electrolyte is facilitated and more rapid.

Production of the Li-ion accumulator according to the invention ends with the blocking of the filling aperture.

Other variants and improvements may be implemented without however departing from the scope of the invention.

Thus, for example, by way of variants, although in the illustrated embodiments detailed above the folded portions 21 or 31 were folded along two straight lines that were aligned with each other and passed through the center of the roll of the cell C, it is possible to envision embodiments with portions folded in other radial directions.

For example, it is thus possible to envision folding:
either along four straight lines 21 or 31 passing through the center of the roll of the cell, the four straight lines being angularly spaced apart by 90° (FIGS. 14 to 14C);
or along three straight lines 21 or 31 passing through the center of the roll of the cell, the three straight lines being angularly spaced apart by 120° (FIG. 15);
or two straight lines 21 or 31 not passing through the center of the roll of the cell (FIG. 16).

Figure 19A:
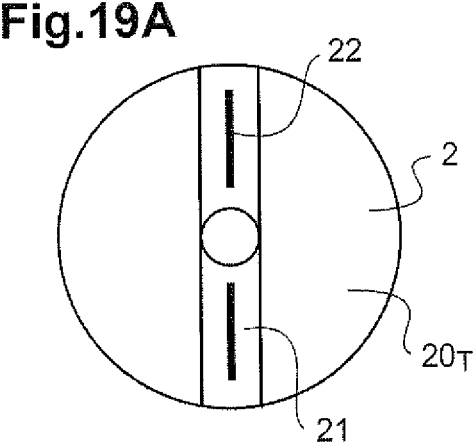
Figure 19B:
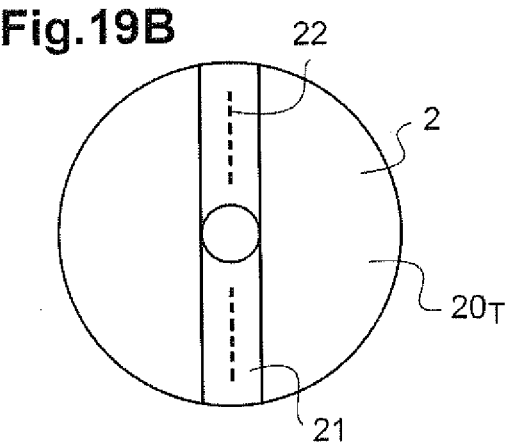
Figure 19C:
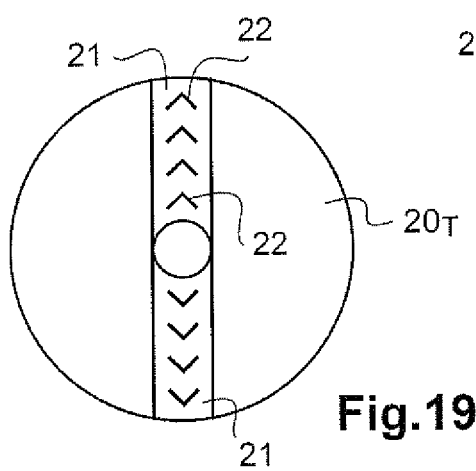
Figure 19D:
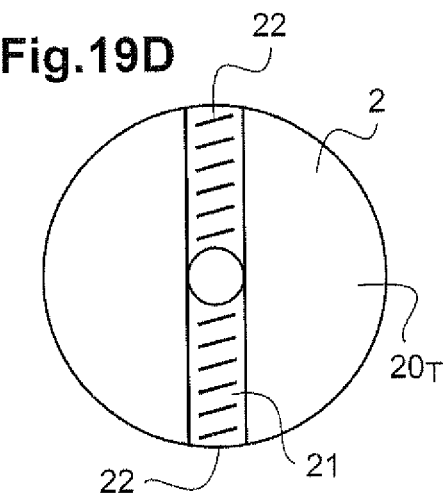
Figure 19E:
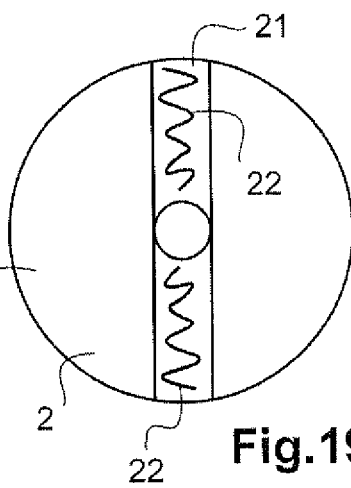

Moreover, by way of variants, although in the illustrated embodiments detailed above the welds between the folded portions 21 or 31 were continuous welds 22 or 32 (FIG. 19A), it is possible to envision discontinuous welds 22 or 32 taking various forms, such as discontinuous lines (FIG. 19B), chevrons (FIG. 19C), inclined segments (FIG. 19D) or zigzags (FIG. 19E).

Lastly, although the casing 6 in the illustrated embodiments detailed above was made of aluminum, it may also be made of steel, or of nickel-coated steel. In such a variant, a casing made of steel or nickel-coated steel forms the negative potential, the feedthrough 9 then forming the positive pole.

The invention is not limited to the examples described above; it is especially possible to combine together features of the illustrated examples in variants that have not been illustrated.

The invention claimed is:

1. A process for producing an electrochemical bundle of a lithium accumulator, wherein the accumulator is a Li-ion accumulator, with a view to its electrical connection to the output terminals of the accumulator, including the following steps:
a/ providing an electrochemical bundle including at least one electrochemical cell consisting of a cathode and an anode on either side of a separator suitable for being impregnated with an electrolyte, the bundle having a shape that is elongate along a longitudinal axis X1, having, at one of its lateral ends, anode bands that are not coated and, at the other of its lateral ends, cathode bands that are not coated;
b/ folding with plastic deformation, at least in a direction radial to the axis X1, a portion of the bands from the exterior to the interior of the electrochemical bundle, onto an area portion of at least one of the lateral ends so that at least two consecutive bands overlap in their folded portion and so that the folded portions that overlap form a substantially flat area; and
c/ axial tamping along the axis of the bands of the electrochemical bundle, of at least the area portion of the lateral end that is not folded in step b/, the axial tamping being carried out repeatedly so as to obtain in the tamped and not folded area portion of the lateral end, a substantially flat plinth intended to be welded to a current collector.

2. The process for producing an electrochemical bundle as claimed in claim 1, the folding in step b/ and the axial tamping in step c/ being carried out at each of the lateral ends.

3. The process for producing an electrochemical bundle as claimed in claim 1, the thickness of the band portions folded onto a lateral end being smaller than 0.6 mm.

4. The process for producing an electrochemical bundle as claimed in claim 1, the axial tamping in step c/ being carried out on the entire area of a lateral end of the bundle.

5. The process for producing an electrochemical bundle as claimed in claim 1, the electrochemical bundle consisting of a single electrochemical cell being wound upon itself by spooling.

6. The process for producing an electrochemical bundle as claimed in claim 5, the folding in step b/ being carried out along at least one straight line passing through the center of the roll of the cell.

7. The process for producing an electrochemical bundle as claimed in claim 5, the folding in step b/ being carried out along at least one straight line not passing through the center of the roll of the cell.

8. The process for producing an electrochemical bundle as claimed in claim 1, in which a step d/ is carried out of welding together folded band portions of a given lateral end.

9. The process for producing an electrochemical bundle as claimed in claim 8, the welding step d/ being carried out between the step b/ of radial folding and the step c/ of axial tamping.

10. The process for producing an electrochemical bundle as claimed in claim 8, the welding step d/ consisting in obtaining a weld by ultrasonic, electric or laser welding.

11. A process for producing an electrical connection portion between an electrochemical bundle of a lithium accumulator and one of the output terminals of the accumulator, including the following steps:
   producing an electrochemical bundle according to the process as claimed in claim 1;
   welding together folded band portions of the electrochemical bundle of a given lateral end according to step d/ that is carried out of welding together folded band portions of a given lateral end; and
   welding the plinth obtained to a current collector itself intended to be electrically connected or coupled to an output terminal of the accumulator.

12. The process for producing an electrical connection portion as claimed in claim 11, in which the welding step d/ and the step of welding the plinth to a current collector are carried out simultaneously.

13. The process for producing an electrical connection portion as claimed in claim 12, prior to the simultaneous welding steps, a current collector is brought into contact against the plinth, the current collector including:
   one or more contact ribs suitable for making contact against the plinth; and
   one or more apertures bounded by holding tabs suitable for holding in place the folded band portions of the electrochemical bundle.

14. The process for producing an electrical connection portion as claimed in claim 12, the simultaneous welding steps being carried out by laser welding.

* * * * *